June 11, 1929. T. REILLY 1,716,736
FOLDING UNDERCARRIAGE FOR AIRCRAFT
Filed July 2, 1928
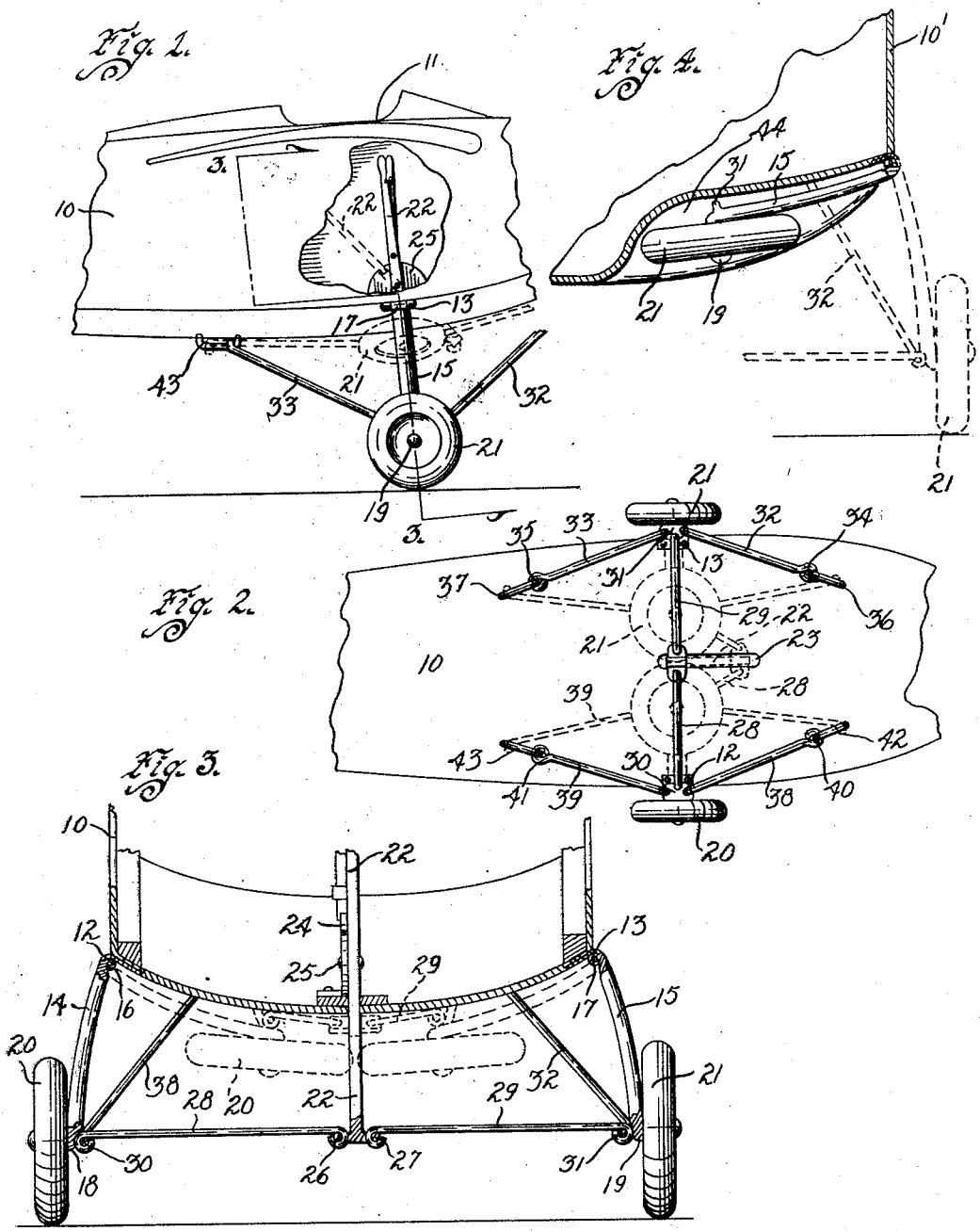
Inventor
Thomas Reilly
by Bair, Freeman & Sinclair
Attorneys
Witness
Vinton Read.

Patented June 11, 1929.

1,716,736

UNITED STATES PATENT OFFICE.

THOMAS REILLY, OF FONDA, IOWA.

FOLDING UNDERCARRIAGE FOR AIRCRAFT.

Application filed July 2, 1928. Serial No. 289,955.

The object of this invention is to provide an improved undercarriage or landing gear for airplanes and the like.

A further object of the invention is to provide means for reducing air friction on an airplane by folding its undercarriage or landing gear closely against or within the fuselage during flight.

A further object is to provide improved means for mounting the undercarriage of an airplane in such manner that it may be folded or compacted during flight by the operation of a lever.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of a portion of the fuselage of an airplane equipped with my improved landing gear, the dotted lines indicating the folded position.

Figure 2 is a bottom plan view of the same.

Figure 3 is a cross section on the line 3—3 of Figure 1.

Figure 4 is a cross sectional view showing a modified form wherein parts of the landing gear are foldable within a recess formed in the bottom of the fuselage.

I have employed the numeral 10 to designate generally, the fuselage of an airplane having a cockpit opening 11. On the opposite sides of the lower portion of the fuselage 10 and approximately opposite the cockpit, are mounted hinge members 12 and 13.

Struts 14 and 15 are formed at their upper ends with eyes 16 and 17, which are pivotally connected with the hinge members 12 and 13 respectively. At their lower ends, the struts 14 and 15 are formed with outwardly directed spindles 18 and 19 on which ground wheels 20 and 21 are journaled.

A hand lever 22 is suitably fulcrumed between its ends in the cockpit and adjacent the driver's seat and the lower portion of said lever is extended through a longitudinal slot 23 formed in the bottom of the fuselage. The lever 22 is provided with suitable detent devices 24 for engaging a segment 25 to hold the lever in any position in which it may be placed manually.

The lower end of the lever 22 is formed with oppositely directed apertured ears 26 and 27 and links 28 and 29 pivotally engage said ears and extend laterally where they are pivotally connected at their opposite ends to ears 30 and 31 formed on the lower end portions of the struts 14 and 15 respectively.

Hinged braces 32 and 33 are pivotally connected to the ear 30 of the strut 14 and respectively extend forwardly and rearwardly therefrom and are formed at their opposite ends with eyes 34 and 35. The eyes 34 and 35 slidably engage elongated loops or keepers 36 and 37 mounted on the bottom of the fuselage.

In a similar manner, hinged braces 38 and 39 are pivoted to the ears 31 of the strut 15 and are formed with eyes 40 and 41 slidably engaging loops or keepers 42 and 43 at the opposite side of the bottom of the fuselage.

For taking off and landing, the control lever 22 is placed in substantially upright position, as shown by solid lines in the drawing, and the links 28 and 29 together with the sliding braces 32, 33, 38 and 39, serve to hold the struts 14 and 15 in their extended positions so that the wheels 20 and 21 are in substantially vertical planes, as required for contact with the ground surface.

When the plane has taken off, the detent members are released and the upper end of the lever 22 is pulled rearwardly thus throwing its lower end forwardly and upwardly toward the bottom of the fuselage, thereby exerting an inward and forward pull on the links 28 and 29.

Since the links 28 and 29 are pivoted at both ends and the lower ends of the struts 14 and 15 are connected in both directions by the sliding braces 32—33 and 38—29, this movement causes the struts to be folded inwardly and upwardly, the eyes of said braces sliding on their keepers away from the transverse plane extending through the axes of the wheels. This serves to fold the elements of the landing gear into positions quite closely contacting with the bottom of the fuselage, as indicated by the dotted lines in Figures 1, 2 and 3.

When it is desired to make a landing, the detent devices are released and the lever 22 returned to its former position, which has the effect of extending the elements of the landing gear to such positions that the wheels will contact with the ground surface.

By folding the undercarriage upwardly into a position close to the body of the fuselage, the projecting parts are decreased and the outline of the plane made more compact, whereby air friction is reduced, thus facilitating the travel of the plane and tending to conserve fuel.

By thus folding the undercarriage upwardly, I have also made it possible to more quickly clear objects projecting above the surface of the ear, such as trees, buildings, poles, and wires, and have thus added an element of safety to the operation of the airplane.

If desired, the struts 14 and 15 and other parts may be curved or otherwise shaped so that they can assume positions more closely contacting the bottom of the fuselage.

In the construction according to Figure 4, the fuselage 10' is formed with a transverse recess or recesses 44 in its bottom to receive all or major portions of the landing gear when in folded position.

By means of this arrangement, the projecting parts are further reduced when the undercarriage is folded, thus increasing the efficiency of the airplane in flight.

I claim as my invention:

1. A folding undercarriage for aircraft, comprising struts hinged to the bottom of the fuselage thereof, ground wheels pivoted on the lower portions of said struts, a lever fulcrumed in the fuselage, links pivotally connecting the lower end of said lever to the lower ends of said struts, braces pivoted to the lower end of each strut and extending forwardly and rearwardly therefrom, and pivotal sliding connections between the opposite ends of said braces and the bottom of the fuselage.

2. A folding undercarriage for aircraft, comprising struts hinged to the bottom of the fuselage thereof, ground wheels pivoted on the lower portions of said struts, a lever fulcrumed in the fuselage, links pivotally connecting the lower end of said lever to the lower ends of said struts, braces pivoted to the lower end of each strut and extending forwardly and rearwardly therefrom, and elongated keepers on the bottom of the fuselage for pivotally and slidably receiving the opposite ends of the respective braces.

3. A folding undercarriage for aircraft, comprising struts hinged to the bottom of the fuselage thereof, ground wheels pivoted on the lower portions of said struts, a lever fulcrumed in the fuselage, links pivotally connecting the lower end of said lever to the lower ends of said struts, braces pivoted to the lower end of each strut and extending forwardly and rearwardly therefrom, and pivotal sliding connections between the opposite ends of said braces and the bottom of the fuselage, the bottom of the fuselage being formed with recesses to receive portions of the undercarriage when in folded position.

Des Moines, Iowa, June 22, 1928.

THOMAS REILLY.